United States Patent
Hasegawa et al.

(10) Patent No.: US 10,001,424 B2
(45) Date of Patent: Jun. 19, 2018

(54) PHYSICAL QUANTITY DETECTOR

(71) Applicant: DENSO CORPORATION, Kariya, Aichi-pref. (JP)

(72) Inventors: Naoki Hasegawa, Kariya (JP); Kazuyuki Oono, Kariya (JP)

(73) Assignee: DENSO CORPORATION, Kariya (JP)

( * ) Notice: Subject to any disclaimer, the term of this patent is extended or adjusted under 35 U.S.C. 154(b) by 187 days.

(21) Appl. No.: 15/112,714

(22) PCT Filed: Mar. 3, 2015

(86) PCT No.: PCT/JP2015/001114
§ 371 (c)(1),
(2) Date: Jul. 20, 2016

(87) PCT Pub. No.: WO2015/133129
PCT Pub. Date: Sep. 11, 2015

(65) Prior Publication Data
US 2016/0349132 A1    Dec. 1, 2016

(30) Foreign Application Priority Data

Mar. 5, 2014  (JP) ................................. 2014-042469
May 9, 2014  (JP) ................................. 2014-097480

(51) Int. Cl.
*G01L 9/00*    (2006.01)
*G01L 19/00*   (2006.01)
(Continued)

(52) U.S. Cl.
CPC .................................... *G01L 9/045* (2013.01)

(58) Field of Classification Search
CPC ....... G01L 9/00; G01L 9/02; G01L 9/04; G01L 9/045; G01L 9/06; G01L 9/065;
(Continued)

(56) References Cited

U.S. PATENT DOCUMENTS

| 5,042,307 A * | 8/1991 | Kato ................... G01L 1/2281 73/708 |
| 2016/0209287 A1 * | 7/2016 | Hirayama ............. G01L 9/065 |
| 2016/0231187 A1 * | 8/2016 | Wosnitza ................ G01L 19/04 |

FOREIGN PATENT DOCUMENTS

| JP | 2000-162065 A | 6/2000 |
| JP | 2008-116287 A | 5/2008 |
| WO | 2015/133128 A1 | 9/2015 |

* cited by examiner

*Primary Examiner* — Nguyen Ha
(74) *Attorney, Agent, or Firm* — Posz Law Group, PLC (57) ABSTRACT

A physical quantity detector includes: a bridge circuit portion that includes a bridge circuit including a first, second, third, and fourth strain gauges each having a resistance value that changes in response to an application of a physical quantity and to temperature, the bridge circuit portion outputting, as a first detection signal, a first voltage, and outputting, as a second detection signal, a second voltage; a temperature characteristic adjustment portion that is connected in parallel to the bridge circuit portion, and outputs, as a third detection signal, a third voltage corresponding to the input voltage; a first signal processing circuit portion that receives the first and second detection signals, and outputs a first differential voltage; and a second signal processing circuit portion that receives the second and third detection signals, and outputs a second differential voltage.

7 Claims, 3 Drawing Sheets

(51) Int. Cl.
*G01L 19/04* (2006.01)
*G01L 27/00* (2006.01)
*G01L 9/04* (2006.01)

(58) Field of Classification Search
CPC . G01L 9/08; G01L 19/00; G01L 19/04; G01L 19/12; G01L 27/00
See application file for complete search history.

PHYSICAL QUANTITY DETECTOR

CROSS REFERENCE TO RELATED APPLICATIONS

The present application is a U.S. national stage of International Application No. PCT/JP2015/001114 filed on Mar. 3, 2015 and is based on Japanese Patent Application No. 2014-42469 filed on Mar. 5, 2014 and Japanese Patent Application No. 2014-97480 filed on May 9, 2014, the disclosures of which are incorporated herein by reference.

TECHNICAL FIELD

The present disclosure relates to a physical quantity detector configured to detect a physical quantity.

BACKGROUND ART

Conventionally, a physical quantity detector configured to detect a physical quantity has been proposed in, for example, Patent Literature 1. The detector includes a thin diaphragm which can be deformed in response to the application of a physical quantity and multiple strain gauges whose resistance value changes by distortion in response to the distortion of the diaphragm. The individual strain gauges are connected so as to form a bridge circuit portion.

The detector includes the two bridge circuit portions described above. Accordingly, it is possible to determine that either one of the bridge circuit portions has suffered a failure or characteristic fluctuations when a difference between physical quantities based on respective output signals from the two bridge circuit portions exceeds a normal range.

PRIOR ART LITERATURE

Patent Literature

Patent Literature 1: JP 2008-116287 A

SUMMARY OF INVENTION

It is an object of the present disclosure to provide a physical quantity detector that enables to determine an abnormality in the bridge circuit portion despite its configuration including one bridge circuit portion.

According to one aspect of the present disclosure, a physical quantity detector a bridge circuit portion, a temperature characteristic adjustment portion, a first signal processing circuit portion, and a second signal processing circuit portion. The bridge circuit portion includes a bridge circuit including a first strain gauge, a second strain gauge, a third strain gauge, and a fourth strain gauge each having a resistance value that changes in response to an application of a physical quantity and changes in response to temperature, the bridge circuit portion outputting, as a first detection signal, a first voltage obtained at a first middle point between the first strain gauge and the second strain gauge based on an input voltage applied to the bridge circuit, and outputting, as a second detection signal, a second voltage obtained at a second middle point between the third strain gauge and the fourth strain gauge.

The temperature characteristic adjustment portion is connected in parallel to the bridge circuit portion, the temperature characteristic adjustment portion having a resistance value change smaller than a resistance value change of the first strain gauge, the second strain gauge, the third strain gauge, and the fourth strain gauge in response to application of the physical quantity and to the temperature and outputting, as a third detection signal, a third voltage corresponding to the input voltage applied to the bridge circuit portion.

The first signal processing circuit portion receives the first detection signal and the second detection signal, and outputs, as a first differential voltage signal, a first differential voltage obtained by amplifying a differential voltage between the first voltage and the second voltage by a first amplification factor.

The second signal processing circuit portion receives the second detection signal and the third detection signal, and outputs, as a second differential voltage signal, a second differential voltage obtained by amplifying a differential voltage between the second voltage and the third voltage by a second amplification factor, which is different from the first amplification factor.

In the physical quantity detector of the present disclosure, the first signal processing circuit portion acquires the first differential voltage which tends to depend on the state of the bridge circuit portion. By contrast, the temperature characteristic adjustment portion generates the stable, i.e., constant third voltage irrespective of an abnormality in the bridge circuit portion. Accordingly, the second signal processing circuit portion acquires the second differential voltage which does not tend to depend on the state of the bridge circuit portion. Thus, when an abnormality occurs in the bridge circuit portion, it may be possible to vary the first differential voltage relative to the second differential voltage. Therefore, by comparing the first differential voltage and second differential voltage to each other, it may be possible to determine the presence or absence of an abnormality in the bridge circuit portion. Thus, it may be possible to detect an abnormality in the bridge circuit portion, despite the configuration including one bridge circuit portion.

BRIEF DESCRIPTION OF DRAWINGS

The above and other aspects, features and advantages of the present disclosure will become more apparent from the following detailed description made with reference to the accompanying drawings. In the drawings.

EMBODIMENTS FOR CARRYING OUT INVENTION

The inventors of the present application have found the following. In a conventional technique, two bridge circuit portions are provided in a detector. This may undesirably increase the size and cost of the detector. The inventors of the present application have made a study to pursue a possibility of providing a configuration including one bridge circuit portion which allows, despite the one bridge circuit portion, an abnormality in the bridge circuit portion to be determined.

The inventors of the present application have proposed the following circuit configuration. In the circuit configuration, one bridge circuit portion is connected between a power supply and the ground, and an adjustment resistor is connected in parallel to the bridge circuit portion. Each strain gauge included in the bridge circuit portion has a temperature characteristic, while the adjustment resistor has substantially no temperature characteristic. To the bridge circuit portion and the adjustment resistor, a constant current is supplied.

In addition, two middle points in the bridge circuit portion are connected individually to a first signal processing circuit portion and a second signal processing circuit portion. Each of the signal processing circuit portions is configured to amplify the signal input thereto by the same amplification factor. The second signal processing circuit portion is connected to each of the middle points in the bridge circuit portion so as to have a polarity reverse to that of the first signal processing circuit portion.

In such a configuration, when the temperature to which the bridge circuit portion is exposed is high, the resistance value of each of the strain gauges increases so that, in the adjustment resistor, a current larger than in the bridge circuit portion flows. By contrast, when the temperature to which the bridge circuit portion is exposed is low, the resistance value of each of the strain gauges decreases so that, in the bridge circuit portion, a current larger than in the adjustment resistor flows. Thus, the differential voltage at each of the middle points in the bridge circuit portion does not depend on temperature. It may be possible to make the sensitivity of the bridge circuit portion constant.

In addition, outputs from the individual signal processing circuit portions have values of polarities reverse to each other so that the sum total of the outputs from the individual signal processing circuit portions is constant. By comparing the outputs from the individual signal processing circuit portions to each other, it is also possible to determine an abnormality in either one of the signal processing circuit portions.

However, even when an abnormality has occurred in the bridge circuit portion, the outputs from the individual signal processing circuit portions have values of polarities reverse to each other. Accordingly, the sum total of the outputs from the individual signal processing circuit portions is constant. That is, a component based on the abnormality in the bridge circuit portion is not reflected on the sum total of the outputs from the individual signal processing portions. Consequently, an abnormality in the bridge circuit portion cannot be determined on the basis of the outputs from the individual signal processing circuit portions.

The following will describe the embodiments of the present disclosure on the basis of the drawings. In the following description of the different embodiments, like or equivalent component parts are designated by like reference characters or numerals.

First Embodiment

Figure 1:
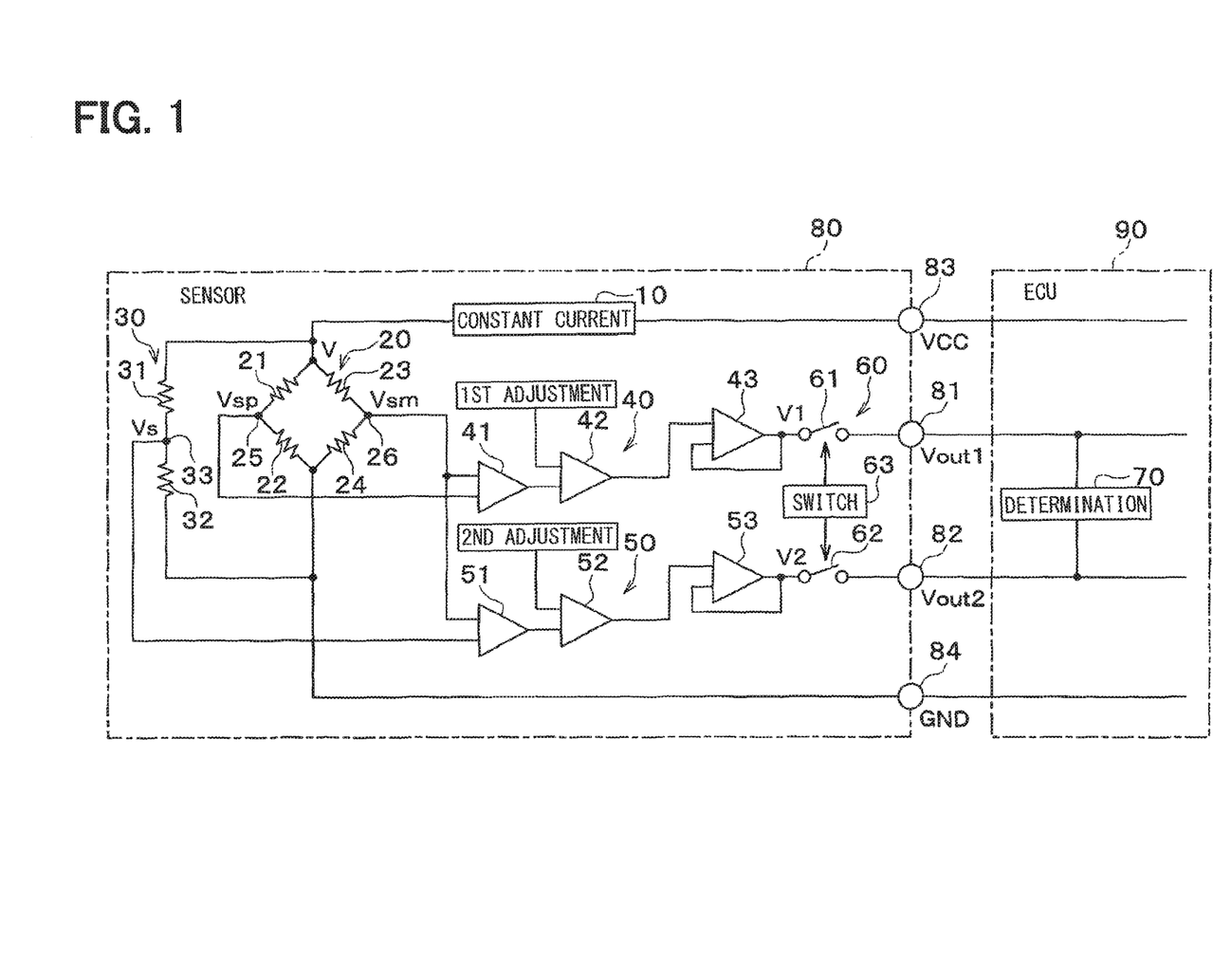
FIG. 1 is a diagram illustrating an overall configuration of a physical quantity detector according to a first embodiment of the present disclosure.

The following will describe the first embodiment of the present disclosure with reference to the drawings. A physical quantity detector according to the present embodiment is configured as a pressure sensor apparatus that detects, for example, the pressure of a pressure medium. As shown in FIG. 1, a physical quantity detector includes a constant current circuit portion 10, a bridge circuit portion 20, a temperature characteristic adjustment portion 30, a first signal processing circuit portion 40, a second signal processing circuit portion 50, a cut-off circuit portion 60, and a determination circuit portion 70.

Of the physical quantity detector, the constant current circuit portion 10, the bridge circuit portion 20, the temperature characteristic adjustment portion 30, the first signal processing circuit portion 40, the second signal processing circuit portion 50, and the cut-off circuit portion 60 are configured as a sensor apparatus 80. By contrast, the determination circuit portion 70 is provided in an ECU 90 (Electrical Control Unit).

The constant current circuit portion 10 is configured to generate a constant current. The constant current circuit portion 10 supplies the generated constant current to each of the bridge circuit portion 20 and the temperature characteristic adjustment portion 30.

The bridge circuit portion 20 corresponds to a sensing means (referred to also as sensing portion) that outputs a detection signal in accordance with the pressure of the pressure medium. The bridge circuit portion 20 is configured to include a first strain gauge 21, a second strain gauge 22, a third strain gauge 23, and a fourth strain gauge 24. Each of the strain gauges 21 to 24 is a resistor having a resistance value which changes in response to the application of a physical quantity and changes in response to temperature.

The individual strain gauges 21 to 24 form a Wheatstone bridge circuit with a series connection portion between the first strain gauge 21 and the second strain gauge 22 and a series connection portion between the third strain gauge 23 and the fourth strain gauge 24 being connected in parallel. Each of the strain gauges 21 to 24 is a diffusion resistor formed in, for example, a semiconductor substrate not shown.

To the bridge circuit portion 20, a constant current is supplied from the constant current circuit portion 10 and an input voltage is applied. Accordingly, the bridge circuit portion 20 outputs a first voltage at a first middle point 25 between the first strain gauge 21 and the second strain gauge 22 as a first detection signal on the basis of the input voltage applied to the Wheatstone bridge circuit. The bridge circuit portion 20 also outputs a second voltage at a second middle point 26 between the third strain gauge 23 and the fourth strain gauge 24 as a second detection signal. For example, when the input voltage is assumed to be V, respective outputs from the middle points 25 and 26 when no pressure is applied to the strain gauges 21 to 24 is equal to V/2.

The temperature characteristic adjustment portion 30 is connected in parallel to the bridge circuit portion 20. Specifically, the temperature characteristic adjustment portion 30 includes a first resistor 31 and a second resistor 32 that are connected in series. The first resistor 31 and the second resistor 32 show resistance value changes in response to the application of pressure and with temperature, the resistance value change being smaller than those shown by the strain gauges 21 to 24 of the bridge circuit portion 20. Each of the first resistor 31 and the second resistor 32 is, for example, a thin film resistor made of CrSi or the like formed over, for example, the semiconductor substrate. For example, the first resistor 31 and the second resistor 32 have the same resistance value.

The temperature characteristic adjustment portion 30 also outputs, as a third detection signal, a third voltage corresponding to the input voltage applied to the bridge circuit portion 20. In the present embodiment, a voltage at a third middle point 33 between the first resistor 31 and the second resistor 32 is assumed to be a third voltage. The respective resistance values of the first resistor 31 and the second resistor 32 have been adjusted such that the third voltage is the same as the differential voltage between the first voltage and the second voltage of the bridge circuit portion 20. For example, when the input voltage is assumed to be V, the third voltage at the third middle point 33 is equal to V/2. That is, the first resistor 31 and the second resistor 32 have the same resistance value.

The first signal processing circuit portion 40 generates a first differential voltage by amplifying the differential voltage between the first voltage and the second voltage in the bridge circuit portion 20 by a first amplification factor and outputs the first differential voltage as a first differential voltage signal. The first signal processing circuit portion 40 is configured to include a first amplification portion 41, a first adjustment portion 42, and a first output portion 43.

The first amplification portion 41 is a differential amplifier configured to receive the first detection signal and the second detection signal from the bridge circuit portion 20 and amplify the differential voltage between the first voltage and the second voltage by a predetermined amplification factor. The first adjustment portion 42 is a signal adjustment means (referred to also as signal adjustment portion) that performs an offset correction or a correction based on a temperature characteristic on an output from the first amplification portion 41.

The first output portion 43 forms a voltage follower as a current booster. The first output portion 43 amplifies the first differential voltage signal subjected to signal adjustment by the first amplification portion 41 and the first adjustment portion 42 by the first amplification factor, and outputs the amplified first differential voltage signal. Since the first differential voltage signal has been generated on the basis of the first voltage and the second voltage in the bridge circuit portion, the first differential voltage signal depends on temperature.

The second signal processing circuit portion 50 generates a second differential voltage by amplifying the differential voltage between the second voltage in the bridge circuit portion 20 and the third voltage in the temperature characteristic adjustment portion 30 by a second amplification factor different from the first amplification factor, and outputs the second differential voltage as a second differential voltage signal. The second signal processing circuit portion 50 is configured to include a second amplification portion 51, a second adjustment portion 52, and a second output portion 53.

The second amplification portion 51 is a differential amplifier configured to receive the second detection signal from the bridge circuit portion 20, while receiving the third detection signal from the temperature characteristic adjustment portion 30, and amplify the differential voltage between the second and third voltages by a predetermined amplification factor. The second adjustment portion 52 is a signal adjustment means (referred to also as signal adjustment portion) that performs offset correction or correction based on a temperature characteristic on an output from the second amplification portion 51.

The second output portion 53 forms a voltage follower as a current booster. The second output portion 53 amplifies the second differential voltage signal subjected to signal adjustment by the second amplification portion 51 and the second adjustment portion 52 by the second amplification factor, and outputs the amplified second differential voltage signal, in the present embodiment, the second amplification factor is set to double the first amplification factor. Since the second differential voltage signal has been generated on the basis of the third voltage of the temperature characteristic adjustment portion 30, the second differential voltage signal has a sensitivity different from that of the first differential voltage signal.

The cut-off circuit portion 60 controls the output of a signal from the sensor apparatus 80 to the ECU 90. The cut-off circuit portion 60 is configured to include a first switch portion 61, a second switch portion 62, and a switching portion 63.

The first switch portion 61 is a switch means (referred to also as switch portion) that electrically connects or disconnects the first output portion 43 and a first output terminal 81 (Vout1) of the sensor apparatus 80. The second switch portion 62 is a switch means (referred to also as switch portion) that electrically connects or disconnects the second output portion 53 and a second output terminal 82 (Vout2) of the sensor apparatus 80.

The switching portion 63 controls connection or disconnection of the first switch portion 61 and the second switch portion 62. The switching portion 63 controls the first switch portion 61 and the second switch portion 62 so as to cut off the output of a signal which has been determined to be abnormal by the determination circuit portion 70 of the first differential voltage signal and the second differential voltage signal.

The determination circuit portion 70 determines the presence or absence of an abnormality in the bridge circuit portion 20. The determination circuit portion 70 receives the first differential voltage signal and the second differential voltage signal from the sensor apparatus 80 and determines whether the first differential voltage and the second differential voltage are within a normal range. For example, the determination circuit portion 70 determines whether the sum total of the first differential voltage and the second differential voltage is within a normal range. The determination circuit portion 70 may also determine whether the difference between the first differential voltage and the second differential voltage is within a normal range. The determination circuit portion 70 also gives an instruction to the switching portion 63 of the cut-off circuit portion 60 of the sensor apparatus 80 depending on the result of the determination. The determination circuit portion 70 allows the presence or absence of an abnormality in the bridge circuit portion 20 to be detected in the physical quantity detector. Note that the normal range is, for example, a predetermined range.

Note that the ECU 90 is configured to perform control using a pressure value in addition to the determination circuit portion 70. Also, the sensor apparatus 80 is configured to receive a power supply from the ECU 90 via a power supply terminal 83 (VCC) and a ground terminal 84 (GND). The foregoing is the overall configuration of the physical quantity detector according to the present embodiment.

Next, a description will be given of the operation of the physical quantity detector. It is assumed herein that each of initial potentials at the first middle point 25 and the second middle point 26 in the bridge circuit portion 20 is equal to Vg. It is also assumed that an offset component in the bridge circuit portion 20 is equal to a, which is a parameter proportional to a constant current. An offset component due to the first resistors 31 and the second resistor 32 in the temperature characteristic adjustment portion 30 is assumed to be β. It is also assumed that a variation in each of voltages at the middle points 25 and 26 due to the application of pressure to the bridge circuit portion 20 is equal to ΔV.

In addition to the foregoing, the amplification factor of each of the first amplification portion 41 of the first signal processing circuit portion 40 and the second amplification portion 51 of the second signal processing circuit portion 50 is assumed to be A. It is also assumed that the first amplification factor of the first output portion 43 of the first signal processing circuit portion 40 is B, and the second amplification factor of the second output portion 53 of the second signal processing circuit portion 50 is 2B.

First, a description will be given of the case where the bridge circuit portion 20 is normally operating.

(During Normal Operation: When Pressure is 0 (MPa))

In the case where no pressure is applied to the bridge circuit portion 20, when the first voltage at the first middle point 25 in the bridge circuit portion 20 is assumed to be Vsp, Vsp is given by Expression 1.

$$Vsp=Vg+\alpha \quad \text{(Expression 1)}$$

Likewise, when the second voltage at the second middle point 26 in the bridge circuit portion 20 is assumed to be Vsm, Vsm is given by Expression 2.

$$Vsm=Vg-\alpha \quad \text{(Expression 2)}$$

Also, when the third voltage at the third middle point 33 in the temperature characteristic adjustment portion 30 is assumed to be Vs, Vs is given by Expression 3.

$$Vs=Vg+\beta \quad \text{(Expression 3)}$$

Accordingly, when the first differential voltage generated in the first signal processing circuit portion 40 is assumed to be V1, V1 is given by Expression 4. It is assumed herein that an offset component adjusted in the first adjustment portion 42 is Vz1 and a temperature characteristic component is Vt1.

$$V1=\{(Vsp-Vsm)\times A+Vz1+Vt1\}\times B=C \quad \text{(Expression 4)}$$

This shows that, as a result of multiplying "Vsp Vsm (=2α)" as the differential voltage between the first voltage and the second voltage by A in the first amplification portion 41, adjusting "Vz1+Vt1" in the first adjustment portion 42, and multiplying the resulting signal by B in the first output portion 43, C is provided. "Vz1+Vt1" is set so as to provide −2Aα. Here, C is the initial offset value of V1 when pressure is 0.

When the second differential voltage generated in the second signal processing circuit portion 50 is assumed to be V2, V2 is given by Expression 5. It is assumed herein that an offset component adjusted in the second adjustment portion 52 is Vz2 and a temperature characteristic component is Vt2.

$$V2=\{(Vsm-Vs)\times A+Vz2+Vt2\}\times 2B= \quad \text{(Expression 5)}$$

This shows that, as a result of amplifying "Vsm−Vs (=−α−β)" as the differential voltage between the second and third voltages by A in the second amplification portion 51, adjusting "Vz2+Vt2" in the second adjustment portion 52, and amplifying the resulting signal by 2B in the second output portion, D is provided. "Vz2+Vt2" is set so as to provide, for example, A(α+β). Here, D is the initial offset value of V2 when pressure is 0.

(During Normal Operation: When Pressure is P (MPa))

When a pressure P is applied to the bridge circuit portion 20, the first voltage (Vsp) at the first middle point 25 in the bridge circuit portion 20 is given by Expression 6. It is assumed that Vg does not vary in response to pressure.

$$Vsp=Vg+\alpha+\Delta V \quad \text{(Expression 6)}$$

Likewise, the second voltage (Vsm) at the second middle point 26 in the bridge circuit portion 20 is given by Expression 7.

$$Vsm=Vg-\alpha-\Delta V \quad \text{(Expression 7)}$$

Also, the third voltage (Vs) at the third middle point 33 in the temperature characteristic adjustment portion 30 is given by Expression 8.

$$Vs=Vg+\beta \quad \text{(Expression 8)}$$

Accordingly, the first differential voltage (V1) generated in the first signal processing circuit portion 40 is given by Expression 9.

$$V1=\{(Vsp-Vsm)\times A+Vz1+Vt1\}B=C+2AB\Delta V \quad \text{(Expression 9)}$$

This shows that, as a result of multiplying "Vsp−Vsm (=2α+2ΔV)" by A in the first amplification portion 41, adjusting "Vz1+Vt1 (=−2Aα)" in the first adjustment portion 42, and multiplying the resulting signal by B in the first output portion 43, "+2ABΔV" varies. The component of 2ABΔV has a magnitude in accordance with a pressure value.

Also, the second differential voltage (V2) generated by the second signal processing circuit portion 50 is represented by Expression 10.

$$V2=\{(Vsm-Vs)\times A+Vz2+Vt2\}\times 2B=D-2AB\Delta V \quad \text{(Expression 10)}$$

This shows that, as a result of multiplying "Vsm−Vs (=−α−β−ΔV)" by A in the second amplification portion 51, adjusting "Vz2−Vt2 (=A (α+β))" in the second adjustment portion 52, and multiplying the resulting signal by 2B in the second output portion 53, "−2ABΔV" varies.

Figure 2:
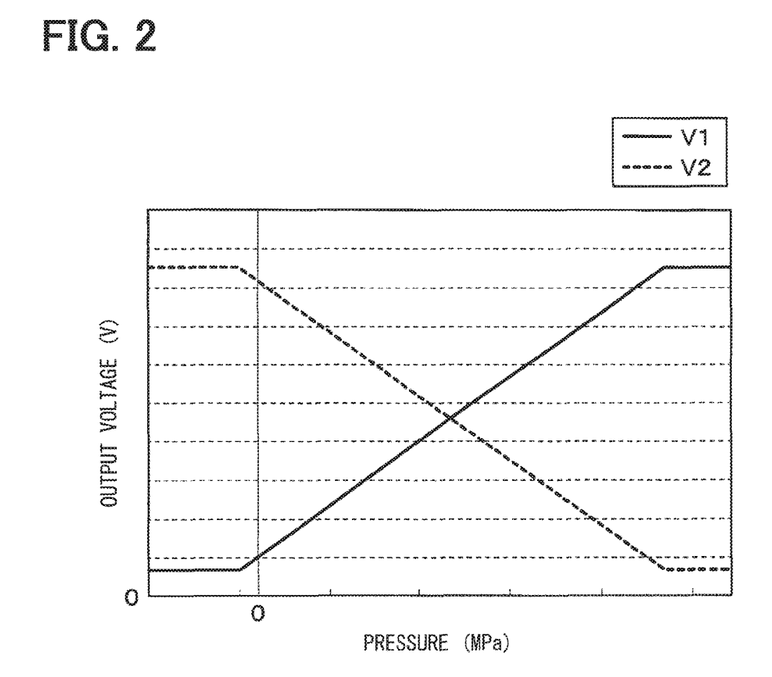
FIG. 2 is a diagram showing variations in a first differential voltage (V1) and a second differential voltage (V2) to a pressure when a bridge circuit portion is normal.

Thus, when pressure is applied, the values having polarities reverse to each other are calculated, as shown in Expression 9 and Expression 10. Accordingly, as shown in FIG. 2, the first differential voltage (V1) generated in the first signal processing circuit portion 40 increases with a given gradient as the pressure increases, while the second differential voltage (V2) generated in the second signal processing circuit portion 50 decreases with the same gradient of the first differential voltage (V1). Accordingly, the sum total of the first differential voltages (V1) and the second differential voltage (V2) is constant.

The determination circuit portion 70 of the ECU 90 acquires the sum total of the first differential voltage (V1) and the second differential voltage (V2). Then, the determination circuit portion 70 determines that the sum total of the first differential voltage (V1) and the second differential voltage (V2) is within a normal range.

Subsequently, a description will be given of the case where, in the bridge circuit portion 20, an abnormality has occurred in the first voltage (Vsp) and of the case where, in the bridge circuit portion 20, an abnormality has occurred in the second voltage (Vsm). The "abnormality" used herein means durability fluctuations or another abnormality. A component representing the abnormality is assumed to be γ.

(When Abnormality has Occurred in First Voltage (Vsp))

When the pressure P (MPa) is applied to the bridge circuit portion 20, the first voltage (Vsp) at the first middle point 25 in the bridge circuit portion 20 is given by Expression 11.

$$Vsp=Vg+\alpha+\Delta V+\gamma \quad \text{(Expression 11)}$$

Likewise, the second voltage (Vsm) at the second middle point 26 in the bridge circuit portion 20 is given by Expression 12.

$$Vsm=Vg-\alpha-\Delta V \quad \text{(Expression 12)}$$

Also, the third voltage (Vs) at the third middle point 33 in the temperature characteristic adjustment portion 30 is given by Expression 13.

$$Vs=Vg+\beta \quad \text{(Expression 13)}$$

Accordingly, the first differential voltage (V1) generated in the first signal processing circuit portion 40 is given by Expression 14.

$$V1=\{(Vsp-Vsm)\times A+Vz1+Vt1\}\times B=C+2AB\Delta V+2AB\gamma \quad \text{(Expression 14)}$$

This shows that, as a result of multiplying "Vsp−Vsm (=2α+2ΔV+γ)" by A in the first amplification portion 41, adjusting "Vz1+Vt1 (=−2Aα)" in the first adjustment portion 42, and multiplying the resulting signal by B in the first output portion 43, "+2ABΔV+2ABγ" varies.

Also, the second differential voltage (V2) generated in the second signal processing circuit portion 50 is given by Expression 15.

$$V2=\{(Vsm-Vs)\times A+Vz2+Vt2\}\times 2B=D-2AB\Delta V \quad \text{(Expression 15)}$$

This shows that, as a result of multiplying "Vsm−Vs (=−α−β−ΔV)" by A in the second amplification portion 51, adjusting "Vz2−Vt2 (=A(α+β))" in the second adjustment portion 52, and multiplying the resulting signal by 2B in the second output portion 53, "−2ABΔV" varies.

Thus, when an abnormality has occurred in the first voltage (Vsp), as shown in Expression 14 and Expression 15, a difference is produced in the component "2ABγ". The difference is produced since, while the first voltage (Vsp) in the bridge circuit portion 20 changes due to the abnormality, the third voltage (Vs) in the temperature characteristic adjustment portion 30 is stable at a particular value. That is, since the degrees to which the first differential voltage (V1) and the second differential voltage (V2) are affected by the abnormality are set to be different, it is possible to generate a component based on the abnormality.

Therefore, the determination circuit portion 70 determines that the sum total of the first differential voltages (V1) and the second differential voltage (V2) exceeds the normal range. The determination circuit portion 70 also determines that the abnormality is in the first voltage (Vsp) on the basis of the value of 2ABγ and gives an instruction to cut off the first switch portion 61 to the cut-off circuit portion 60.

(When Abnormality has Occurred in Second Differential Voltage (V2))

When the pressure P (MPa) is applied to the bridge circuit portion 20, the first voltage (Vsp) at the first middle point 25 in the bridge circuit portion 20 is given by Expression 16.

$$Vsp=Vg+\alpha+\Delta V \quad \text{(Expression 16)}$$

Likewise, the second voltage (Vsm) at the second middle point 26 in the bridge circuit portion 20 is given by Expression 17.

$$Vsm=Vg-\alpha-\Delta V+\gamma \quad \text{(Expression 17)}$$

Also, the third voltage (Vs) at the third middle point 33 in the temperature characteristic adjustment portion 30 is given by Expression 18.

$$Vs=Vg+\beta \quad \text{(Expression 18)}$$

Accordingly, the first differential voltage (V1) generated in the first signal processing circuit portion 40 is given by Expression 19.

$$V1=\{(Vsp-Vsm)\times A+Vz1+Vt1\}\times B=C+2AB\Delta V+AB\gamma \quad \text{(Expression 19)}$$

This shows that, as a result of multiplying "Vsp−Vsm (=2α+2ΔV−γ)" by A in the first amplification portion 41, adjusting "Vz1+Vt1 (=2Aα)" in the first adjustment portion 42, and multiplying the resulting signal by B in the first output portion 43, "+2ABΔV+AB" varies.

Also, the second differential voltage (V2) generated in the second signal processing circuit portion 50 is given by Expression 20.

$$V2=\{(Vsm-Vs)\times A+Vz2+Vt2\}\times 2B=D-2AB\Delta V+2AB\gamma \quad \text{(Expression 20)}$$

This shows that, as a result of multiplying "Vsm−Vs (=−α−β−ΔV+γ)" by A in the second amplification portion 51, adjusting "Vz2+Vt2 (=A (α+β))" in the second adjustment portion 52, and multiplying the resulting signal by 2B in the second output portion 53, "−2ABΔV+2ABγ" varies.

Thus, when an abnormality has occurred in the second differential voltage (V2), as shown in Expression 19 and Expression 20, a difference is produced in the component "ABγ". Therefore, the determination circuit portion 70 determines that the sum total of the first differential voltage (V1) and the second differential voltage (V2) exceeds a normal range. The determination circuit portion 70 also determines that the abnormality is in the second differential voltage (V2) on the basis of the value of ABγ and gives an instruction to cut off the second switch portion 62 to the cut-off circuit portion 60.

Subsequently, a description will be given of the case where, when the pressure P is applied to the bridge circuit portion 20, an abnormality occurs in the constant current circuit portion 10. It is assumed herein that a component due to the abnormality in the constant current circuit portion 10 is δ.

In this case, the first voltage (Vsp) in the bridge circuit portion 20 is given by Expression 21.

$$Vsp=\delta(Vg+\alpha+\Delta V) \quad \text{(Expression 21)}$$

Likewise, the second voltage (Vs in the bridge circuit portion 20 is given by Expression 22.

$$Vsm=\delta(Vg-\alpha-\Delta V) \quad \text{(Expression 22)}$$

Also, the third voltage (Vs) at the third middle point 33 in the temperature characteristic adjustment portion 30 is given by Expression 23.

$$Vs=\delta(Vg+\beta) \quad \text{(Expression 23)}$$

Since an abnormality in the constant current circuit portion 10 affects the bridge circuit portion 20 and the temperature characteristic adjustment portion 30 as a whole, the first voltage (Vsp), the second voltage (Vsm), and the third voltage (Vs) are dominated by δ.

The first differential voltage (V1) generated in the first signal processing circuit portion 40 is given by Expression 24.

$$V1=\{(Vsp-Vsm)\times A+Vz1+Vt1\}\times B=C+\{\delta A(2\alpha+2\Delta V)-2A\alpha\}\times B \quad \text{(Expression 24)}$$

Also, the second differential voltage (V2) generated by the second signal processing circuit portion 50 is given by Expression 25.

$$V2=\{(Vsm-Vs)\times A+Vz2+Vt2\}\times 2B=D+\{\delta A(-\alpha-\beta-\Delta V)+A(\alpha+\beta)\}\times 2B \quad \text{(Expression 25)}$$

Thus, as shown in Expression 24 and Expression 25, when an abnormality has occurred in the constant current circuit portion 10, the first differential voltage (V1) and the second differential voltage (V2) have totally different values. Therefore, the determination circuit portion 70 determines that the sum total of the first differential voltage (V1) and the second differential voltage (V2) exceeds a normal value. The determination circuit portion 70 also determines that the abnormality is in the constant current circuit portion 10 on the basis of the sum total and gives an instruction to cut off the first switch portion 61 and the second switch portion 62 to the cut-off circuit portion 60.

As described above, in the present embodiment, the first signal processing circuit portion 40 of the sensor apparatus 80 is configured to acquire the first differential voltage (V1), which tends to depend on the state of the bridge circuit portion 20. By contrast, the temperature characteristic adjustment portion 30 generates the constant third voltage irrespective of an abnormality in the bridge circuit portion 20. Accordingly, the second signal processing circuit portion 50 is configured to acquire the second differential voltage (V2), which does not tend to depend on the state of the bridge circuit portion 20. Thus, when an abnormality occurs in the bridge circuit portion 20, it is possible to vary the first differential voltage (V1) relative to the second differential voltage (V2). It is also possible to vary the first differential voltage (V1) and the second differential voltage (V2) when an abnormality has occurred in the constant current circuit portion 10.

Thus, despite the configuration including a single bridge circuit portion 20, it is possible to determine the presence or absence of an abnormality in the bridge circuit portion 20 on the basis of the first differential voltage (V1) and the second differential voltage (V2).

Second Embodiment

Figure 3:
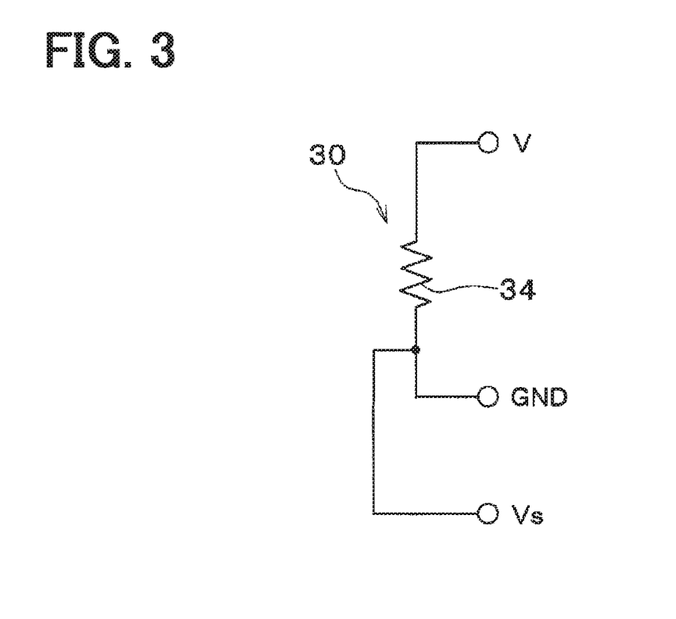
FIG. 3 is a diagram showing a circuit configuration of a temperature characteristic adjustment portion according to a second embodiment of the present disclosure.

In the present embodiment, a description will be given of a portion different from the first embodiment. In the present embodiment, as shown in FIG. 3, the temperature characteristic adjustment portion 30 is formed of a single third resistor 34. The LOW-side voltage of the third resistor 34, i.e., the ground voltage is used as the third voltage (Vs). Thus, the third voltage (Vs) corresponding to the input voltage (V) applied to the bridge circuit portion 20 may also be the ground voltage.

Note that the third resistor 34 in the present embodiment corresponds to a "resistor" in the present disclosure.

Third Embodiment

Figure 4:
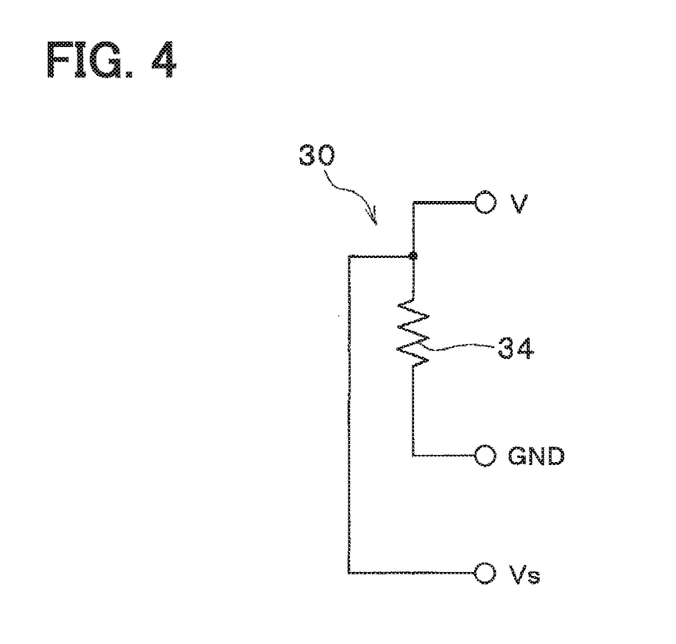
FIG. 4 is a diagram showing a circuit configuration of the temperature characteristic adjustment portion according to a third embodiment of the present disclosure.

In the present embodiment, a description will be given of a portion different from the first embodiment and the second embodiment. In the present embodiment, as shown in FIG. 4, the HIGH-side voltage of the third resistor 34, i.e., the input voltage is used as the third voltage (Vs). Thus, the third voltage (Vs) corresponding to the input voltage (V) applied to the bridge circuit portion 20 may also be the input voltage (V).

Fourth Embodiment

A configuration of the physical quantity detector according to the present embodiment is the same as the configuration shown in FIG. 1. However, while the first to fourth strain gauges 21 to 24 in the bridge circuit portion 20 according to each of the foregoing embodiments are configured as the Wheatstone bridge circuit that satisfies an equilibrium condition, the first to fourth strain gauges 21 to 24 in the bridge circuit portion 20 according to the present embodiment are configured as a bridge circuit that does not satisfy the equilibrium condition. That is, the respective resistance values of the first to fourth strain gauges 21 to 24 are set so as not to satisfy the equilibrium condition. Thus, the gauge balance between the first to fourth strain gauges 21 to 24 has been disturbed in advance. Consequently, the bridge circuit portion 20 outputs the first detection signal and the second detection signal each including an offset component.

The first signal processing circuit portion 40 has a first offset correction value for correcting the offset component included in each of the first detection signal and the second detection signal. The first signal processing circuit portion 40 corrects the first differential voltage using the first offset correction value, and outputs the first differential voltage signal. Note that the first adjustment portion 42 performs the correction using the first offset correction value.

By contrast, the second signal processing circuit portion 50 has a second offset correction value for correcting the offset component included in the second detection signal. The second signal processing circuit portion 50 corrects the second differential voltage using the second offset correction value and outputs the second differential voltage signal. Note that the second adjustment portion 52 performs the correction using the second offset correction value.

The determination circuit portion 70 of the ECU 90 has not only the function of determining the presence or absence of an abnormality in the bridge circuit portion 20 described above, but also the function of determining the presence or absence of an abnormality in the constant current circuit portion 10. The determination circuit portion 70 receives the first differential voltage signal from the first signal processing circuit portion 40, while receiving the second differential voltage signal from the second signal processing circuit portion 50, and determines whether or not the sum of the first differential voltage and the second differential voltage is within a normal range to determine the presence or absence of an abnormality in the constant current circuit portion 10. The foregoing is the configuration of the physical quantity detector according to the present embodiment.

A description will be given of the operation of determining an abnormality in the constant current circuit portion 10 by the determination circuit portion 70.

First, a description will be given of the case where the constant current circuit portion 10 is normally operating. It is assumed that, when the constant current circuit portion 10 is normally operating, the constant current circuit portion 10 causes a constant current I to flow in the bridge circuit portion 20.

When it is assumed that the resistance value of the first strain gauge 21 is R1 and the resistance value of the second strain gauge 22 is R2, the first voltage (Vsp) at the first middle point 25 is given by Expression 26.

$$Vsp = \{R2/(R1+R2)\} \times I \qquad \text{(Expression 26)}$$

When it is assumed that the resistance value of the third strain gauge 23 is R3 and the resistance value of the fourth strain gauge 24 is R4, the second voltage (Vsm) at the second middle point 26 is given by Expression 27.

$$Vsm = \{R4/(R3+R4)\} \times I \qquad \text{(Expression 27)}$$

When it is assumed that the resistance value of the first resistor 31 in the temperature characteristic adjustment portion 30 is R5 and the resistance value of the second resistor 32 therein is R6, the third voltage Vs at the third middle point 33 in the temperature characteristic adjustment portion 30 is given by Expression 28.

$$Vs = \{R6/(R5+R6)\} \times I \qquad \text{(Expression 28)}$$

Accordingly, the first differential voltage (V1) generated in the first signal processing circuit portion 40 is given by Expression 29.

$$V1 = \{(Vsp-Vsm) \times A + Vz1 + Vt1\} \times B = \Delta E - \Delta E = 0 \qquad \text{(Expression 29)}$$

This shows that, as a result of multiplying "Vsp−Vsm (=Rg1×I)" as the differential voltage between the first voltage and the second voltage by AB in the first amplification portion 41, ΔE is provided and "(Vz1+Vt1)×B (=−ΔE)" is subjected to offset adjustment performed in the first adjustment portion 42. That is, the first signal processing circuit portion 40 has −ΔE as the first offset correction value. As described above, since the gauge balance between the first to fourth strain gauges 21 to 24 has been distorted, the first signal processing circuit portion 40 corrects the offset component included in the first detection signal using the first offset correction value (−ΔE). Note that Rg1 is given by Expression 30.

$$Rg1=(R2R3-R1R4)/\{(R1+R2)\times(R3+R4)\}. \quad \text{(Expression 30)}$$

Also, the second differential voltage (V2) generated in the second signal processing circuit portion 50 is given by Expression 31.

$$V2=\{(Vsm-Vs)\times A+Vz2+Vt2\}\times 2B=-(\tfrac{1}{2})\times\Delta E+(\tfrac{1}{2})\times\Delta E=0 \quad \text{(Expression 31)}$$

This shows that, as a result of multiplying "Vsm−Vs (=Rg2×I)" as the differential voltage between the second and third voltages by 2AB in the second amplification portion 51, "−(½)×ΔE' is provided and "(Vz2+Vt2)×2B (=+(½)×ΔE) is subjected to offset adjustment performed in the second adjustment portion 52. That is, the second signal processing circuit portion 50 has "+(½)×ΔE" as the second offset correction value. As described above, since the gauge balance between the first to fourth strain gauges 21 to 24 has been disturbed, the second signal processing circuit portion 50 corrects the offset component included in the first detection signal using the second offset correction value (+(½)×ΔE). Note that Rg2 is given by Expression 32.

$$Rg2=(R4R5-R3R6)/\{(R3+R4)\times(R5+R6)\} \quad \text{(Expression 32)}$$

Then, the determination circuit portion 70 of the ECU 90 acquires the sum total of the first differential voltage (V1) and the second differential voltage (V2). The sum total is given by Expression 33.

$$V1+V2=0 \quad \text{(Expression 33)}$$

The determination circuit portion 70 determines that the sum total of the first differential voltage (V1) and the second differential voltage (V2) is within a normal range and determines that there is no abnormality in the constant current circuit portion 10.

Subsequently, a description will be given of the case where an abnormality has occurred in the constant current circuit portion 10. In this case, the constant current circuit portion 10 causes, for example, an abnormal current 2I to flow in the bridge circuit portion 20. Accordingly, "Vsp−Vsm=Rg1×2I" is satisfied so that the first differential voltage (V1) generated in the first signal processing circuit portion 40 is given by Expression 34.

$$V1=\{(Vsp-Vsm)\times A+Vz1+Vt1\}\times B=2\Delta E-\Delta E=\Delta E \quad \text{(Expression 34)}$$

This shows that, while the value of "(Vsp−Vsm)×A×B (=2ΔE)" is doubled, there is no change in the value of "(Vz1+Vt1)×B (=−ΔE)" as the first offset correction value and consequently LE remains as the result of the arithmetic operation.

By contrast, "Vsm−Vs=Rg2×2I" is satisfied so that the second differential voltage (V2) generated in the second signal processing circuit portion 50 is given by Expression 35.

$$V2=\{(Vsm-Vs)\times A+Vz2+Vt2\}\times 2B=+(\tfrac{1}{2})\times\Delta E=-(\tfrac{1}{2})\times\Delta E \quad \text{(Expression 35)}$$

This shows that, while the value of "(Vsm−Vs)×2AB" is doubled, there is no change in the value of (Vz2+Vt2)×2B (=+(½)×ΔE) and consequently −(½)×ΔE remains as the result of the arithmetic operation.

Then, the determination circuit portion 70 of the ECU 90 acquires the sum total of the first differential voltage (V1) and the second differential voltage (V2). The sum total is given by Expression 36.

$$V1+V2=(\tfrac{1}{2})\times\Delta E \quad \text{(Expression 36)}$$

Thus, when an abnormality has occurred in the constant current circuit portion 10, an abnormal component is produced in the sum total of the first differential voltage (V1) and the second differential voltage (V2). That is, when a change occurs in the current value supplied from the constant current circuit portion 10 to the bridge circuit portion 20, a difference is produced between "Vsp−Vsm" as the first potential difference (V1) and "Vsm−Vs" as the second potential difference (V2). Therefore, the determination circuit portion 70 determines that the sum total of the first differential voltage (V1) and the second differential voltage (V2) exceeds the normal range and determines that an abnormality has occurred in the constant current circuit portion 10.

Note that, when the determination circuit portion 70 determines that an abnormality has occurred in the constant current circuit portion 10, it is also possible for the determination circuit portion 70 to cause the cut-off circuit portion 60 to operate and cut off the output of a signal from the sensor apparatus 80 to the ECU 90.

As described above, when an abnormality has occurred in the constant current circuit portion 10 to change the current value of the constant current, the offset component of the bridge circuit portion 20 changes. In this case, while the first signal processing circuit portion 40 processes the output from the bridge circuit portion 20, the second signal processing circuit portion 50 processes not only the output from the bridge circuit portion 20, but also the output from the temperature characteristic adjustment portion 30. This allows a difference to be produced between the respective outputs from the first signal processing circuit portion 40 and the second signal processing circuit portion 50. Thus, the sum of the first differential voltage (V1) acquired in the first signal processing circuit portion 40 and the second differential voltage (V2) acquired in the second signal processing circuit portion 50 changes to allow the abnormality in the constant current circuit portion 10 to be detected.

Other Embodiments

The configuration of the physical quantity detector shown in each of the foregoing embodiments is exemplary. The physical quantity detector is not limited to the configuration shown above and can also have another configuration which allows the present disclosure to be implemented. For example, a physical quantity to be detected by the physical quantity detector is not limited to pressure. The target of detection may also be another physical quantity that can be detected by the bridge circuit portion 20.

The configuration of the temperature characteristic adjustment portion 30 is not limited to the configuration shown in each of the foregoing embodiments. For example, the temperature characteristic adjustment portion 30 may also include resistors having resistance values which have been adjusted such that the third voltage (Vs) is the same as the differential voltage between the first voltages (Vsp) and the second voltages (Vsm).

In each of the foregoing embodiments, the second amplification factor of the second amplification portion 51 of the second signal processing circuit portion 50 has been set to double the first amplification factor of the first output portion 43 of the first signal processing circuit portion 40. However, this is an example of the amplification factors. Accordingly, the second amplification factor is not limited to double the first amplification factor.

In each of the foregoing embodiments, the determination circuit portion 70 is provided in the ECU 90 included in the physical quantity detector. However, the determination circuit portion 70 may also be provided in the sensor apparatus 80.

In each of the foregoing embodiments, the determination circuit portion 70 is provided in the ECU 90 included in the physical quantity detector. However, the determination circuit portion 70 need not be provided in the physical quantity detector. Since the physical quantity detector according to each of the foregoing embodiments is configured to output a signal which allows an abnormality in the bridge circuit portion 20 to be determined, the determination of the presence or absence of an abnormality may be performed appropriately at the destination of an output from the physical quantity detector.

In each of the foregoing embodiments, the cut-off circuit portion 60 is provided in the physical quantity detector, but this is an example of the configuration. Accordingly, when there is no need for a configuration for permitting or inhibiting the output of a signal, the cut-off circuit portion 60 need not be provided in the physical quantity detector.

In each of the first and fourth embodiments, the first resistor 31 and the second resistor 32 have the same resistance values, but this is exemplary. Accordingly, the first resistor 31 and the second resistor 32 may also have different resistance values.

To the configuration of the temperature characteristic adjustment portion 30 shown in FIGS. 3 and 4, the bridge circuit portion 20, the first signal processing circuit portion 40, the second signal processing circuit portion 50, and the determination circuit portion 70 each shown in the fourth embodiment may also be applied.

While the embodiments, the configurations, and the modes according to the present disclosure have been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A physical quantity detector, comprising:
a bridge circuit portion that includes a bridge circuit including a first strain gauge, a second strain gauge, a third strain gauge, and a fourth strain gauge each having a resistance value that changes in response to an application of a physical quantity and changes in response to temperature, the bridge circuit portion outputting, as a first detection signal, a first voltage obtained at a first middle point between the first strain gauge and the second strain gauge based on an input voltage applied to the bridge circuit, and outputting, as a second detection signal, a second voltage obtained at a second middle point between the third strain gauge and the fourth strain gauge;
a temperature characteristic adjustment portion that is connected in parallel to the bridge circuit portion, the temperature characteristic adjustment portion having a resistance value change smaller than a resistance value change of the first strain gauge, the second strain gauge, the third strain gauge, and the fourth strain gauge in response to application of the physical quantity and to the temperature, and outputting, as a third detection signal, a third voltage corresponding to the input voltage applied to the bridge circuit portion;
a first signal processing circuit portion that receives the first detection signal and the second detection signal, and outputs, as a first differential voltage signal, a first differential voltage obtained by amplifying a differential voltage between the first voltage and the second voltage by a first amplification factor; and
a second signal processing circuit portion that receives the second detection signal and the third detection signal, and outputs, as a second differential voltage signal, a second differential voltage obtained by amplifying a differential voltage between the second voltage and the third voltage by a second amplification factor, which is different from the first amplification factor.

2. The physical quantity detector according to claim 1, further comprising:
a determination circuit portion that determines an abnormality in the bridge circuit portion by receiving the first differential voltage signal and the second differential voltage signal and by determining whether the first differential voltage and the second differential voltage are within a predetermined normal range.

3. The physical quantity detector according to claim 2, further comprising:
a cut-off circuit portion that cuts off an output of a signal which has been determined to be abnormal by the determination circuit portion of the first differential voltage signal output from the first signal processing circuit portion and the second differential voltage signal output from the second signal processing circuit portion.

4. The physical quantity detector according to any one of claim 1, wherein:
in the bridge circuit portion, respective resistance values of the first strain gauge, the second strain gauge, the third strain gauge, and the fourth strain gauge are set, and the first strain gauge, the second strain gauge, the third strain gauge, and the fourth strain gauge do not satisfy an equilibrium condition, and the bridge circuit portion outputs signals each including an offset component as the first detection signal and the second detection signal;
the first signal processing circuit portion has a first offset correction value correcting the offset component, and corrects the first differential voltage by the first offset correction value; and
the second signal processing circuit portion has a second offset correction value correcting the offset component, and corrects the second differential voltage by the second offset correction value,
the physical quantity detector further comprising:
a constant current circuit portion that supplies a constant current to each of the bridge circuit portion and the temperature characteristic adjustment portion; and a determination circuit portion that determines an abnormality in the constant current circuit portion by receiving the first differential voltage signal and the second differential voltage signal and by determining whether a sum of the first differential voltage and the second differential voltage is within a predetermined normal range.

5. The physical quantity detector according to claim 1, wherein:
the temperature characteristic adjustment portion includes a first resistor and a second resistor having an resistance value identical with the first resistor connected in series, provides a voltage, as the third voltage, obtained at a third middle point between the first resistor and the second resistor, and outputs the third voltage as the third detection signal.

6. The physical quantity detector according to claim 1, wherein:
the temperature characteristic adjustment portion includes a single resistor having a LOW side electrically connected to a ground, uses a LOW-side voltage of the single resistor as the third voltage, and outputs the third voltage as the third detection signal.

7. The physical quantity detector according to claim 1, wherein:
the temperature characteristic adjustment portion includes a single resistor having a HIGH side to which the input voltage is applied, uses the input voltage of the HIGH side to the single resistor as the third voltage, and outputs the third voltage as the third detection signal.

* * * * *